United States Patent
Nielsen et al.

(10) Patent No.: US 11,797,165 B2
(45) Date of Patent: Oct. 24, 2023

(54) OPTIMIZING WELLBORE OPERATIONS FOR SUSTAINABILITY IMPACT

(71) Applicant: Halliburton Energy Services, Inc., Houston, TX (US)

(72) Inventors: Roxana Mehrabadi Nielsen, Spring, TX (US); Karin Witton, Spring, TX (US); Emily Rees, Abington (GB)

(73) Assignee: ENVANA SOFTWARE SOLUTIONS, LLC, Houston, TX (US)

( * ) Notice: Subject to any disclaimer, the term of this patent is extended or adjusted under 35 U.S.C. 154(b) by 70 days.

(21) Appl. No.: 17/446,073

(22) Filed: Aug. 26, 2021

(65) Prior Publication Data

US 2023/0067850 A1 Mar. 2, 2023

(51) Int. Cl.
| | |
|---|---|
| G06F 3/04847 | (2022.01) |
| G05B 15/02 | (2006.01) |
| G06F 3/0482 | (2013.01) |
| E21B 41/00 | (2006.01) |

(52) U.S. Cl.
CPC .......... G06F 3/04847 (2013.01); E21B 41/00 (2013.01); G05B 15/02 (2013.01); G06F 3/0482 (2013.01)

(58) Field of Classification Search
CPC .... G06F 3/04847; G06F 3/0482; E21B 41/00; G05B 15/02
USPC .......................................................... 700/83
See application file for complete search history.

(56) References Cited

U.S. PATENT DOCUMENTS

| | | | |
|---|---|---|---|
| 5,892,362 A | 4/1999 | Warren et al. | |
| 7,647,207 B2 | 1/2010 | Mcconnell et al. | |
| 8,504,306 B2 | 8/2013 | Koch et al. | |
| 11,549,894 B2 * | 1/2023 | Soua | ........................ E21B 49/00 |
| 2009/0287520 A1 | 11/2009 | Zimmerman | |
| 2011/0119112 A1 | 5/2011 | Waibel et al. | |
| 2011/0119113 A1 | 5/2011 | Chatterjee et al. | |
| 2011/0284288 A1 | 11/2011 | Sawyer et al. | |

(Continued)

FOREIGN PATENT DOCUMENTS

| | | |
|---|---|---|
| AU | 2001100305 | 11/2001 |
| CN | 108256830 | 7/2018 |

(Continued)

OTHER PUBLICATIONS

B Lab, "The B Impact Assessment Tool", https://bimpactassessment.net, available on the internet at least as early as Jun. 29, 2021, 3 pages.

(Continued)

*Primary Examiner* — William D Titcomb
(74) *Attorney, Agent, or Firm* — Rimon PC; Marc S. Kaufman

(57) ABSTRACT

A system can receive, at a user interface, at least one constraint and a range for at least one parameter for a wellbore operation. The system can generate, by at least one algorithm, a recommendation of a value for the at least one parameter within the range for the at least one parameter. The recommendation can be based on a sustainability metric and the at least one constraint for the wellbore operation. The system can output, at the user interface, the recommendation of the value for the at least one parameter and an indication of additional outcomes for the sustainability metric using other values within the range for the at least one parameter.

20 Claims, 8 Drawing Sheets

(56) References Cited

U.S. PATENT DOCUMENTS

| | | | |
|---|---|---|---|
| 2020/0090063 A1 | 3/2020 | Reynolds et al. | |
| 2021/0019357 A1 | 1/2021 | Bennett et al. | |
| 2021/0388717 A1* | 12/2021 | Srinivasan | G06N 3/08 |

FOREIGN PATENT DOCUMENTS

| | | |
|---|---|---|
| EP | 1193366 A2 | 4/2002 |
| WO | 2018222602 A1 | 12/2018 |
| WO | 2020139345 A1 | 7/2020 |
| WO | 2021206565 A1 | 10/2021 |

OTHER PUBLICATIONS

DataGumbo, "GumboNet ESG", https://www.datagumbo.com/gumbonet-esg, available on the internet at least as early as Jun. 29, 2021, 3 pages.

Enverus, "ESG in the Energy Industry—Embracing Change", https://future.enverus.com/esg-energy, available on the internet at least as early as Jun. 29, 2021, 4 pages.

Envirosoft, "The Trusted Solution for Oil & Gas Emissions Management & ESG Reporting", https://envirosoft.com, available on the internet at least as early as Jun. 29, 2021, 2 pages.

Envizi, "Sustainability Reporting", https://envizi.com/solutions/sustainability-reporting, available on the internet at least as early as Jun. 29, 2021, 3 pages.

Intelex, "Environmental, Social, and Governance (ESG) Software", https://www.intelex.com/products/applications/esg-management-software, available on the internet at least as early as Jun. 29, 2021, 15 pages.

Opex, "AI for Emissions Reduction", https://www.opex-group.com/solutions/ai-for-emissions-reduction, available on the internet at least as early as Jun. 29, 2021, 4 pages.

Persefoni, "The Intelligent Carbon Footprint Management & Reporting Platform", https://www.persefoni.com, available on the internet at least as early as Jun. 29, 2021, 7 pages.

Solution Seeker, "World's First AI for Real Time Production Optimization", https://www.solutionseeker.no, available on the internet at least as early as Jun. 29, 2021, 5 pages.

PCT App. No. PCT/US2021/071292, "International Search Report and the Written Opinion", dated May 16, 2022, 9 pages.

* cited by examiner

OPTIMIZING WELLBORE OPERATIONS FOR SUSTAINABILITY IMPACT

TECHNICAL FIELD

The present disclosure relates generally to wellbore operations and, more particularly, although not necessarily exclusively, to optimizing wellbore operations for sustainability impact.

BACKGROUND

Hydrocarbon exploration is the search for hydrocarbons, such as oil or gas, within a subterranean formation. Greenhouse gas emissions resulting from wellbore operations can impact the environment. A high carbon footprint or other sustainability metric for a wellbore operation can indicate inefficient processes or areas of the wellbore operation involving excessive resources. Determining a carbon footprint for a wellbore operation may be difficult due to a large amount of data to be analyzed. Additionally, different equipment and services used during a wellbore operation or multiple wellbore operations may have a different impact on the carbon footprint, so if the equipment or services are not known ahead of time, it may be difficult to determine the carbon footprint. And, even if the carbon footprint is determined, it is usually determined later than a time when adjustments can be made. Determining the carbon footprint earlier can prevent a high carbon footprint. Thus, understanding a carbon footprint for wellbore operations can provide significant value for efficient development of hydrocarbon resources.

DETAILED DESCRIPTION

Figure 1:
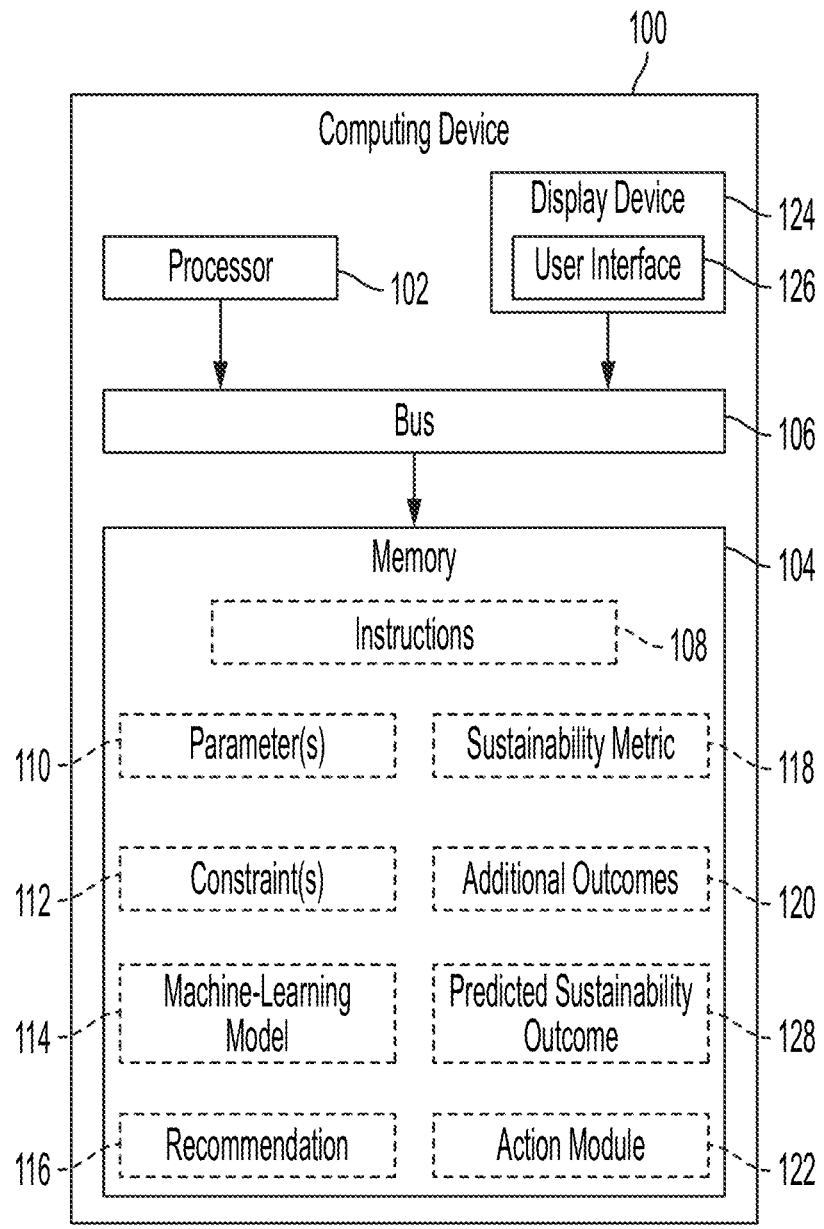
FIG. 1 is a block diagram of an example of a computing device for implementing estimating sustainability impacts of wellbore operations according to one example of the present disclosure.

Certain aspects and examples of the present disclosure relate to estimating sustainability impacts of a wellbore operation based on selected parameters and providing insights for decisions regarding wellbore operations to optimize a sustainability impact. The sustainability impact can include carbon emissions associated with the wellbore operation. By using a system according to some examples, sustainability impacts can be estimated for overall asset management of a reservoir. Some examples may allow parameters of a wellbore operation associated with reducing an environmental impact to be selected before the wellbore operation begins.

In some aspects, a user can be allowed to compare various outcomes from a series of scenarios for one or more wellbore operations. A user interface allows the user to build scenarios through the input of parameters and model constraints that are relevant to the asset being modeled. Examples of the parameters can include equipment or energy sources that are to be used during the wellbore operation. A range of possible parameter values to use for each parameter may be specified. A parameter value can correspond to a percentage for how much of the wellbore operation is associated with using the particular equipment or energy source. Examples of the constraints can include a budget, carbon footprint, or sustainability impact. Each constraint can be considered with regard to a weight that may be defined by the user. Constraints for the wellbore operation, such as a job size and a budget, can also be received. Then, a recommendation for a parameter value within the specified range for each parameter can be determined based on the constraints and a sustainability metric. Examples of the sustainability metric may include an amount of carbon emissions or a cost associated with the wellbore operation. The recommendation can be a parameter value associated with minimizing an environmental impact. The user interface presents those scenarios back to the user, showing the graphical relationship between the various constraints, allowing the user to choose from the recommendation and additional outcomes. The system can receive a modification to a selected scenario, such as receiving a change to the range of parameter values for the parameters, and present live updates to the scenario depending on which items are altered.

Once a scenario is selected, a predicted sustainability outcome associated with the scenario can be applied to future projections of an overall sustainability footprint using data from other, previously selected scenarios for other wellbore operations. The future projections may be compared to a sustainability target, and if the projections exceed the sustainability target, adjustments for the wellbore operation (or the other wellbore operations) may be determined to reduce the future projections. The adjustments can then be made to the corresponding scenario and updated future projections can be generated.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing device 100 for implementing estimating sustainability impacts of wellbore operations according to one example of the present disclosure. The wellbore operations may be drilling operations, fracturing operations, completion operations, production operations, or a combination thereof. The computing device 100 can include a processor 102, a bus 106, a memory 104, and a display device 124. In some examples, the components shown in FIG. 1 can be integrated into a single structure. For example, the components can be within a single housing with a single processing device. In other examples, the components shown in FIG. 1 can be distributed (e.g., in separate housings) and in electrical communication with each other using various processors. It is also possible for the components to be distributed in a cloud computing system or grid computing system.

The processor 102 can execute one or more operations for estimating sustainability impacts for a wellbore operation. The processor 102 can execute instructions stored in the memory 104 to perform the operations. The processor 102 can include one processing device or multiple processing devices. Non-limiting examples of the processor 102 include a field-programmable gate array ("FPGA"), an application-specific integrated circuit ("ASIC"), a processor, a microprocessor, etc.

The processor 102 is communicatively coupled to the memory 104 via the bus 106. The memory 104 may include any type of memory device that retains stored information when powered off. Non-limiting examples of the memory 104 include electrically erasable and programmable read-only memory ("EEPROM"), flash memory, or any other type of non-volatile memory. In some examples, at least some of the memory 104 can include a non-transitory medium from which the processor 102 can read instructions. A computer-readable medium can include electronic, optical, magnetic, or other storage devices capable of providing the processor 102 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C #, etc.

In some examples, the computing device 100 includes a display device 124. The display device 124 can represent one or more components used to output data. Examples of the display device 124 can include a liquid-crystal display (LCD), a computer monitor, a touch-screen display, etc. The display device 124 can include a user interface 126 for receiving inputs and displaying outputs associated with the wellbore operation.

The computing device 100 may include parameter(s) 110 describing the wellbore operation. The computing device 100 may receive the parameter(s) 110 as input from a user associated with the wellbore operation. The parameter(s) 110 can involve specified ranges for energy sources and equipment to be used during the wellbore operation. For example, the parameter(s) may involve ranges for using grid power, one or more dual fuel generators or engines, one or more natural gas or field gas generators, or one or more types of diesel engines. As one particular example, the parameter(s) 110 may include using grid power for between 20% and 100% of the wellbore operation. The computing device 500 can also receive constraint(s) 112 for the wellbore operation. For example, the constraint(s) 112 can include a budget for the wellbore operation and a hydraulic horsepower (HHP) for the wellbore operation. For example, the constraint(s) 112 can be a budget of $5,000,000 and a HHP of 20,000. The constraint(s) 112 may be input by the user. In some examples, the computing device 100 may additionally receive weights to be associated with each of the constraint(s) 112. For example, the user may indicate that the budget is to be associated with a weight of 0.8 and the HHP is to be associated with a weight of 0.2.

The computing device 100 can execute a machine-learning model 114 using the parameter(s) 110 and the constraint(s) as inputs. The computing device 100 can use the machine-learning model 114 to determine a recommendation 116 of a value to use for the parameter(s) 110 within the range of values specified for each of the parameter(s) 110. In addition to the machine-learning model 114, the computing device 100 may use one or more additional algorithms, such as a non-linear optimization, to generate the recommendation 116. The recommendation 116 may be based on a sustainability metric 118 for the wellbore operation. For example, the sustainability metric 118 may be emissions or cost, so the recommendation 116 can be a value for each of the parameter(s) 110 for minimizing the emissions or the cost. Training data can be used to train a neural network for selecting the recommendation 116. In an example, the training data can be historical data associated with parameters and constraints for wellbore operations. The training data may be labeled with a resulting value for the emissions or cost associated with using particular parameters. If weights are specified for the constraint(s) 112, the machine-learning model 114 can use the weights to determine the recommendation 116.

The computing device 100 can also determine additional outcomes 120 for the sustainability metric 118 if other values within the specified ranges are used for the parameter(s) 110. For example, the computing device 100 may generate a graph of outcomes that includes the recommendation 116 and the additional outcomes 120. A user may then select the recommendation 116, or one of the additional outcomes 120 for the wellbore operation. Based on the selection, the computing device 100 can generate a predicted sustainability outcome 128. The predicted sustainability outcome 128 can include the sustainability impact resulting from the selection, as well as the sustainability impact resulting from selections for additional wellbore operations. For example, multiple wellbore operations may be associated with an entity. A user can input parameter(s) 110 and constraint(s) 112 for each of the multiple wellbore operations, receive a recommendation for value(s) for the parameter(s) 110 for each of the multiple wellbore operations, and select either the recommendation or an additional outcome for each of the multiple wellbore operations. The computing device 100 can then combine the sustainability impact for the multiple wellbore operations based on the selections to determine a predicted sustainability outcome 128 for the entity. The computing device 100 can compare the predicted sustainability outcome 128 to a sustainability target, such as for a carbon footprint, for the entity. If the computing device 100 determines that the predicted sustainability outcome 128 exceeds the sustainability target, the computing device 100 can determine an adjustment for one or more of the wellbore operations so that the predicted sustainability outcome 128 meets the sustainability target.

In some examples, the computing device 100 can include an action module 122 that can take the predicted sustainability outcome 128 and apply it to some other process. For example, the computing device 100 can use the predicted sustainability outcome 128 to control a well drilling operation, a well completion operation, or some other process relevant to the predicted sustainability outcome 128. The action module 122 can apply the predicted sustainability outcome 128 to develop a plan for drilling operations, completion operations, or production operations. In some examples, the computing device 100 can implement the process 200 or the process 300 shown in FIGS. 2-3 for effectuating some aspects of the present disclosure. Other examples can involve more operations, fewer operations, different operations, or a different order of the operations shown in FIGS. 2-3. The operations of FIGS. 2-3 are described below with reference to the components shown in FIG. 1.

Figure 2:
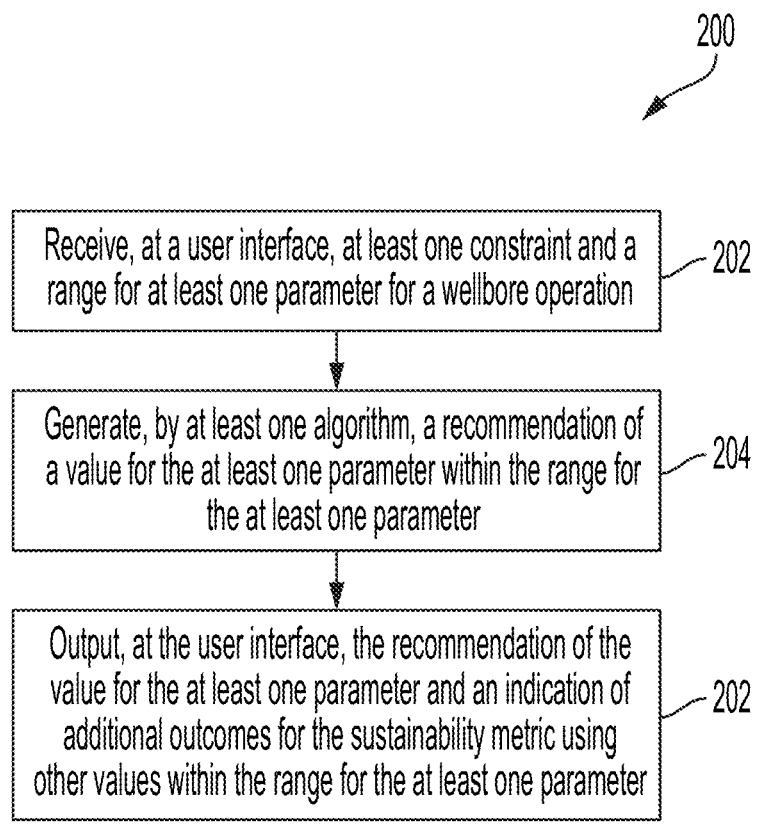
FIG. 2 is a diagram of a process for estimating outcomes for a sustainability metric based on input parameters according to one example of the present disclosure.
Figure 3:
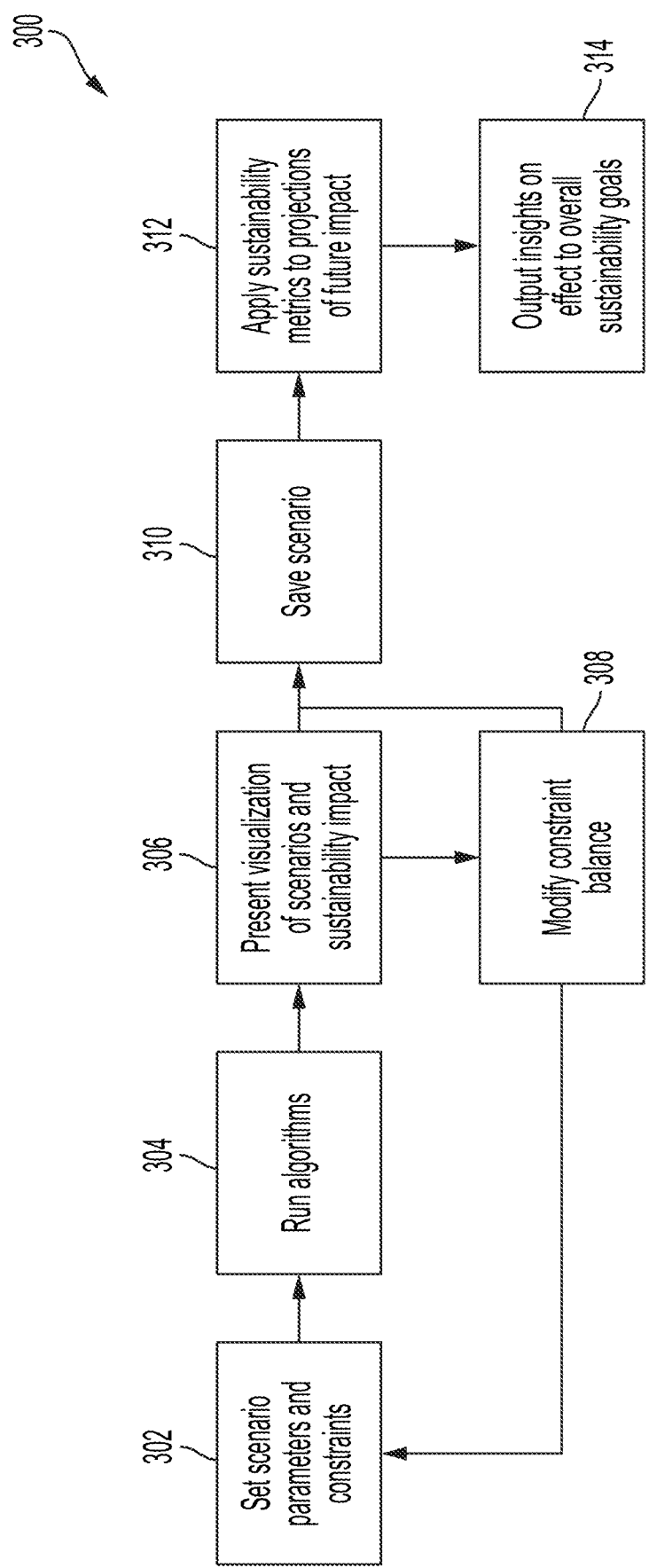
FIG. 3 is a flowchart of a process for estimating outcomes of a sustainability metric based on input parameters according to one example of the present disclosure.

Referring to FIG. 2, in block 202, the processor 102 can receive, at a user interface 126, at least one constraint 112 and a range for at least one parameter 110 for a wellbore operation. For example, a user can input a budget, carbon emissions, or other suitable constraints for the wellbore operation. Additionally, the user can input a range of values for equipment and energy source usage for the wellbore operation. In some example, the processor 102 can also receive weights for the at least one constraint 112.

In block 204, the processor 102 can generate, by a machine-learning model 114, a recommendation 116 of a value for the at least one parameter 110 within the range for the at least one parameter 110. The recommendation 116 can be based on a sustainability metric 118, such as carbon emissions or cost, and the at least one constraint 112 for the wellbore operation. For example, the machine-learning model 114 can output a recommendation 116 of using 49% grid power, 28% tier 4 diesel engines, and 23% tier 2 diesel engines for the wellbore operation to achieve a balance between a lowest cost and a lowest emissions for the wellbore operation.

In block 206, the processor 102 can output, at the user interface 126, the recommendation 116 of the value for the at least one parameter 110 and an indication of additional outcomes 120 for the sustainability metric 118 using other values within the range for the at least one parameter 110. The user interface 126 may display the recommendation 116 and the additional outcomes 120 in a graph that shows parameter values to use for achieving different values for the sustainability metric.

Referring to FIG. 3, in block 302, the processor 102 can set scenario parameter(s) 110 and constraint(s) 112.

In block 304, the processor 102 can run algorithms. The algorithms can include the machine-learning model 114, along with other models, such as non-linear optimization. The algorithms can determine a recommendation 116 for the wellbore operation.

In block 306, the processor 102 can present a visualization of scenarios and sustainability impact. Each of the scenarios can include different parameter values for the parameter(s). The visualization may include an indication of the scenario associated with the recommendation 116.

In block 308, the processor 102 can modify constraint balance. For example, the processor 102 can receive an indication of weights are to be applied for the constraint(s) 112. The processor 102 can then return to block 302 to repeat blocks 302 through 306 using the weights.

In block 310, the processor 102 saves the scenario. The scenario may be the scenario associated with the recommendation 116, or a different scenario selected by a user. The scenario can be saved local to the computing device 100 or remote from the computing device 100 in a location that is accessible by the computing device 100.

In block 312, the processor 102 can apply sustainability metrics to projections of future impacts. For example, a predicted sustainability outcome 128 associated with the scenario can be added with predicted sustainability outcomes for other selected scenarios. The resulting sustainability impact can indicate a projected impact at a future point in time.

In block 314, the processor 102 can output insights on an effect to overall sustainability goals. For example, the processor 102 can determine how the predicted sustainability outcome 128 effects a sustainability target. The processor 102 may determine an adjustment for one or more wellbore operations if the predicted sustainability outcome 128 exceeds the sustainability target.

Figure 4:
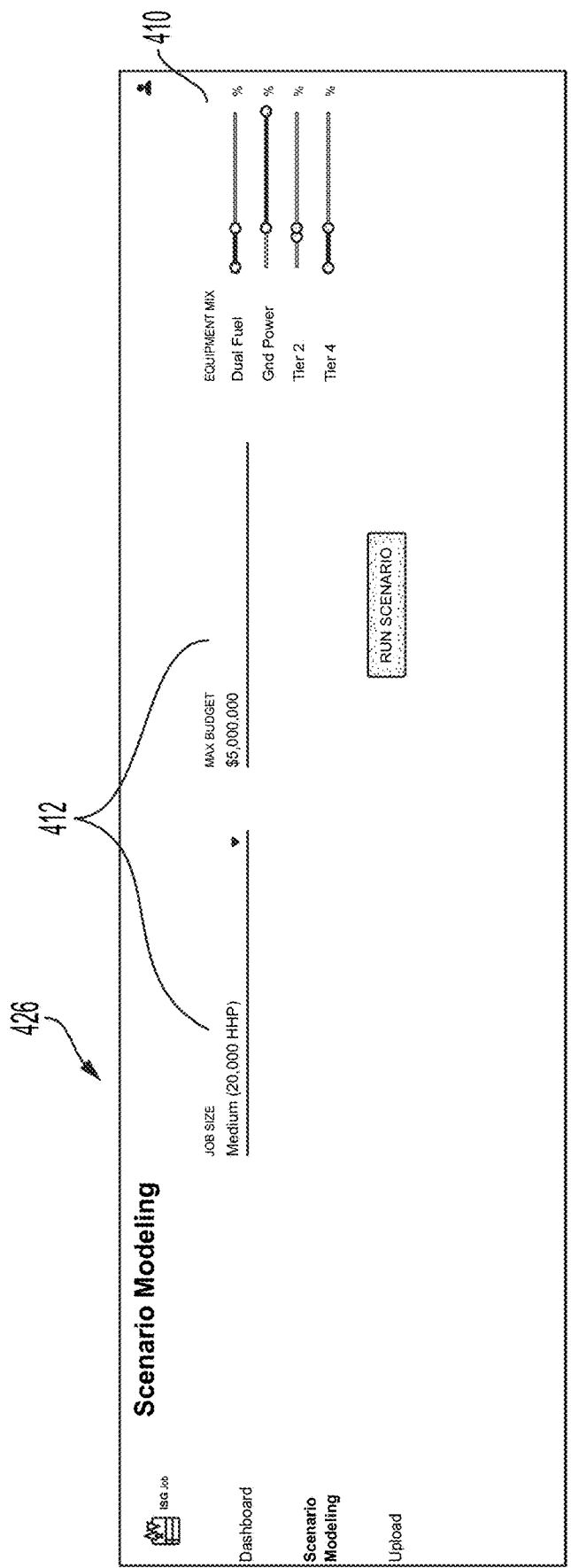
FIG. 4 is an example of a user interface for inputting parameters and constraints for a wellbore operation according to one example of the present disclosure.

FIG. 4 is an example of a user interface 426 for inputting parameters 410 and constraints 412 for a wellbore operation according to one example of the present disclosure. The user interface 426 includes sliders for indicating ranges for the parameters 410. Other examples may include text boxes for receiving numerical inputs for the ranges for the parameters 410. The parameters 410 are shown to include equipment usage ranges for dual fuel generators, grid power, tier 2 diesel engines, and tier 4 diesel engines. For example, the parameters 410 show a ranges of 0% to 20% for duel fuel generators, 18% to 100% for grid power, 15 to 20% for tier 2 diesel engines, and 0% to 20% for tier 4 diesel engines. The user interface 426 also includes drop-down menus for selecting the constraints 412 for the wellbore operation. The constraints 412 illustrated a job size, indicated by an HHP value, and a budget. For example, the constraints 412 show a selection of a medium job size corresponding to 20,000 HHP and a budget of $5,000,000. The user interface 426 includes a button that can be selected for generating a recommendation for the parameters 410 based on the constraints 412.

Figure 5:
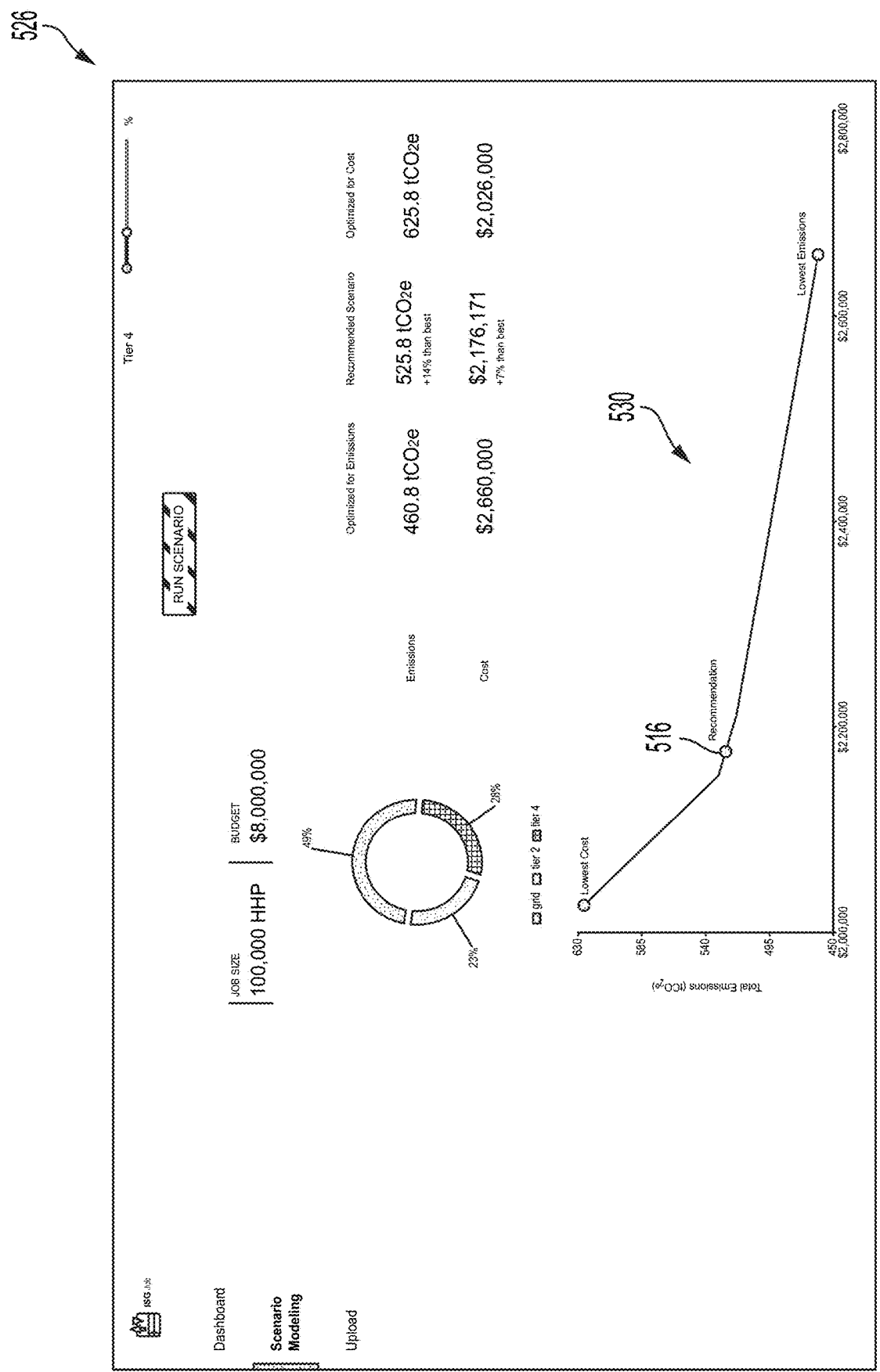
FIG. 5 is an example of a user interface presenting a recommended parameter value for a wellbore operation according to one example of the present disclosure.

FIG. 5 is an example of a user interface 526 presenting recommended parameter values for a wellbore operation according to one example of the present disclosure. The user interface 526 may be below the user interface 426 in FIG. 4 subsequent to the parameters and constraints being selected. Parameter values and associated costs and emissions are presented as a graph 530. A recommendation 516 on the graph 530 can be parameter values that balance sustainability metrics (e.g., emissions and cost) for the wellbore operation. For example, the user interface 526 shows possible outcomes that minimize emissions and cost, and the recommendation 516 balances the emissions and the cost. As illustrated, the recommendation 516 involves using 49% grid power, 28% tier 4 diesel engines, and 23% tier 2 diesel engines. The recommended scenario is shown to result in an estimated emissions of 525.8 $tCO_2e$ and an estimate cost of $2,176,171. A user may scroll over any portion of the graph 530 to see associated parameter values, emissions, and cost. A user may select any point along the graph 530 to save as the selected parameter values for the wellbore operation.

Figure 6:
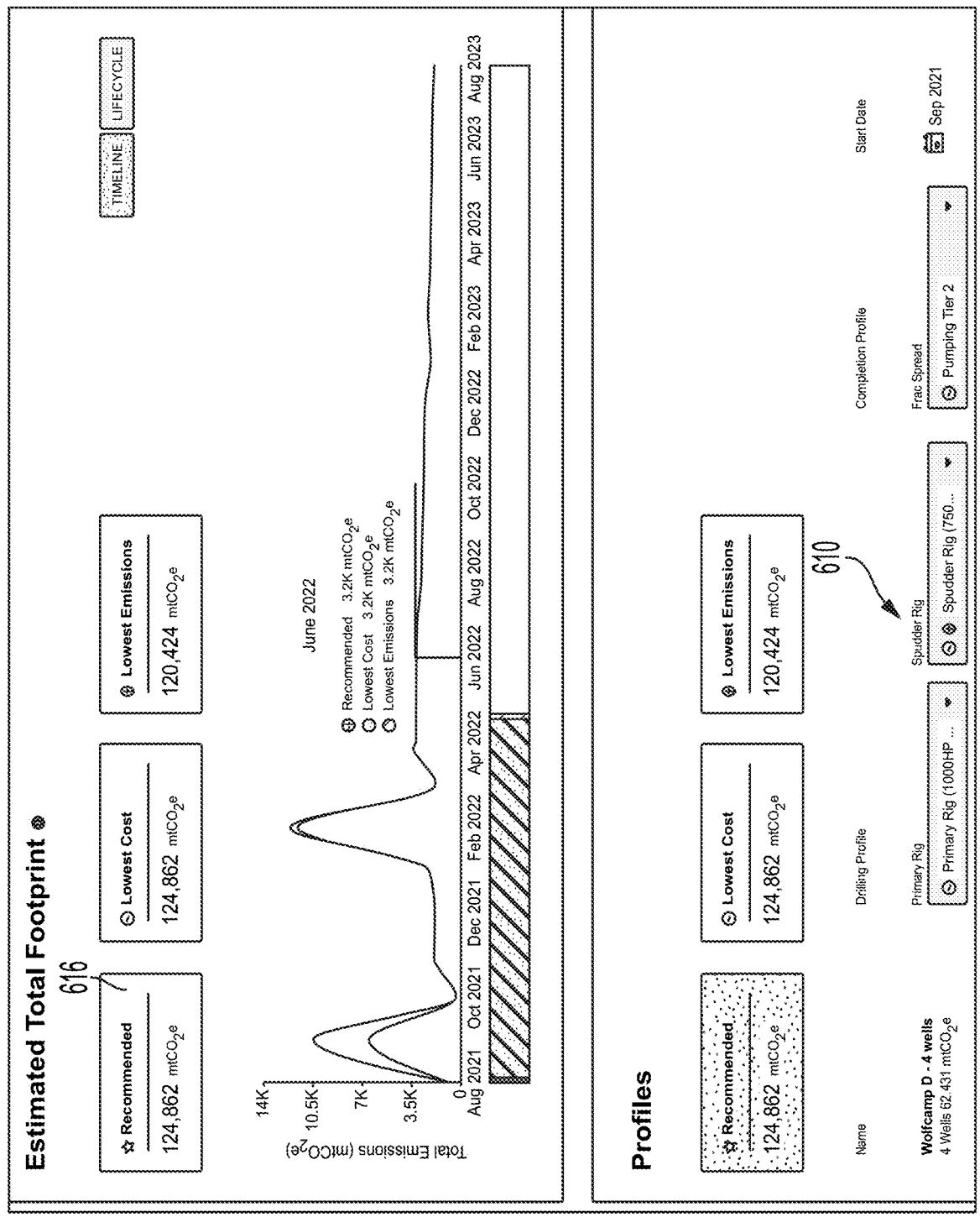
FIG. 6 is an example of a user interface for presenting estimated sustainability impacts of a wellbore operation according to one example of the present disclosure.

FIG. 6 is an example of a user interface 626 for presenting estimated sustainability impacts of a wellbore operation according to one example of the present disclosure. The user interface 626 may receive parameters 610 from a user to use for a wellbore operation. The parameters 610 can include equipment to use during the wellbore operation. For example, the user can select drilling profile of a primary rig and a spudder rig for a drilling operation. The user interface 626 may also receive a selection for a completion profile of a fracturing spread for a completion operation. The user interface 626 can present a recommendation 616, and a graph showing emissions over time associated with using the recommendation 616. Additionally, the graph can show emissions over time associated with using parameters associated with a lowest cost scenario and a lowest emissions scenario. The user can then select a scenario to use for the wellbore operation.

Figure 7:
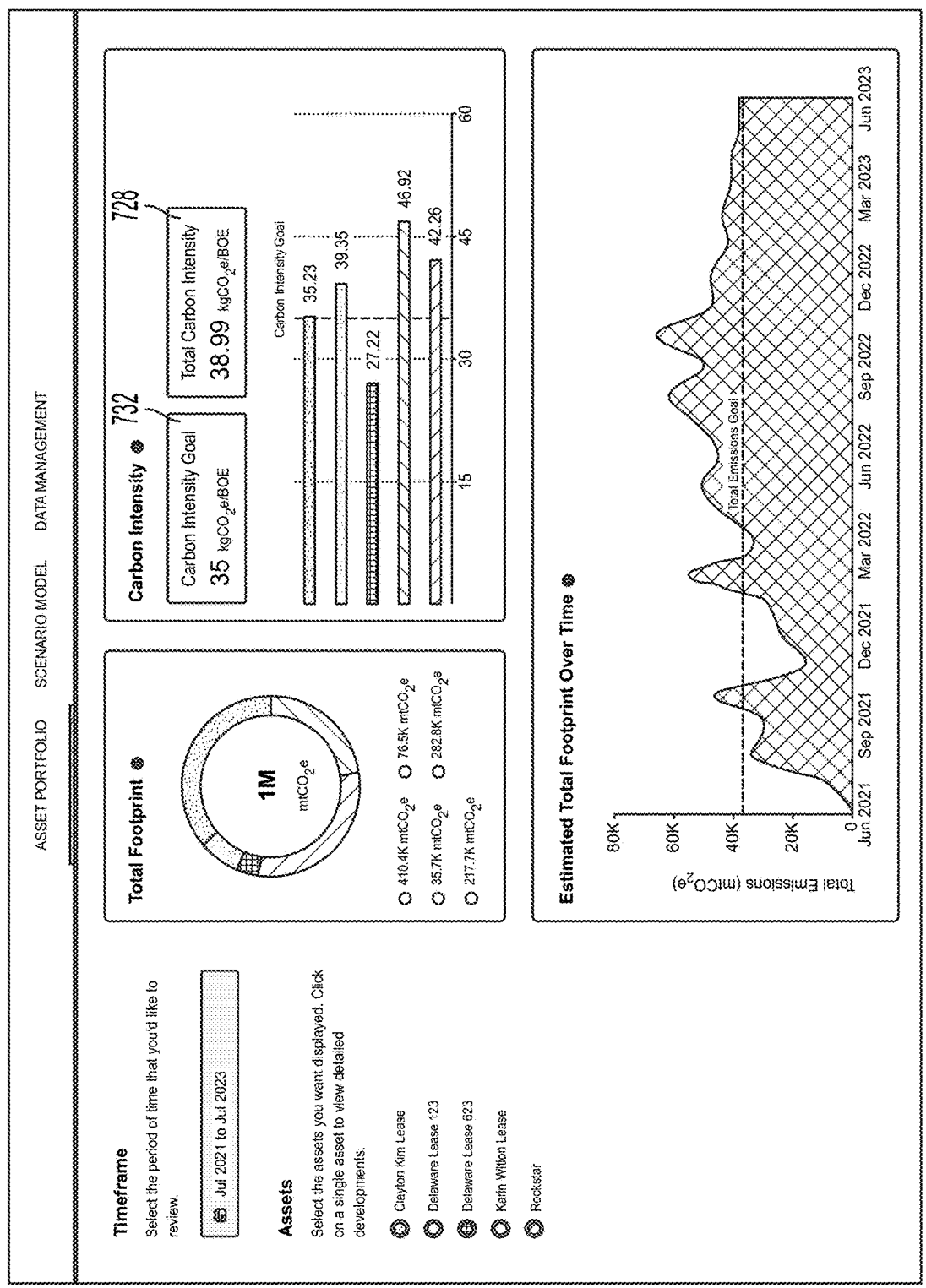
FIG. 7 is an example of a user interface for presenting estimated sustainability impacts of multiple wellbore operations according to one example of the present disclosure.

FIG. 7 is an example of a user interface 726 for presenting estimated sustainability impacts of multiple wellbore operations according to one example of the present disclosure. The user interface 726 can display a sustainability target 732 associated with carbon intensity for wellbore operations and a predicted sustainability outcome 728 resulting from the wellbore operations. The user interface 726 illustrates five wellbore operations that contribute to the predicted sustainability outcome 728 and a contribution of each wellbore operation to the predicted sustainability outcome 728. A user may determine an adjustment to be made to one or more of the wellbore operations based on the predicted sustainability outcome 728 exceeding the sustainability target 732. Alternatively, the user interface 726 may present a recommended adjustment for a wellbore operation to cause the predicted sustainability outcome 728 to meet the sustainability target 732.

Figure 8:
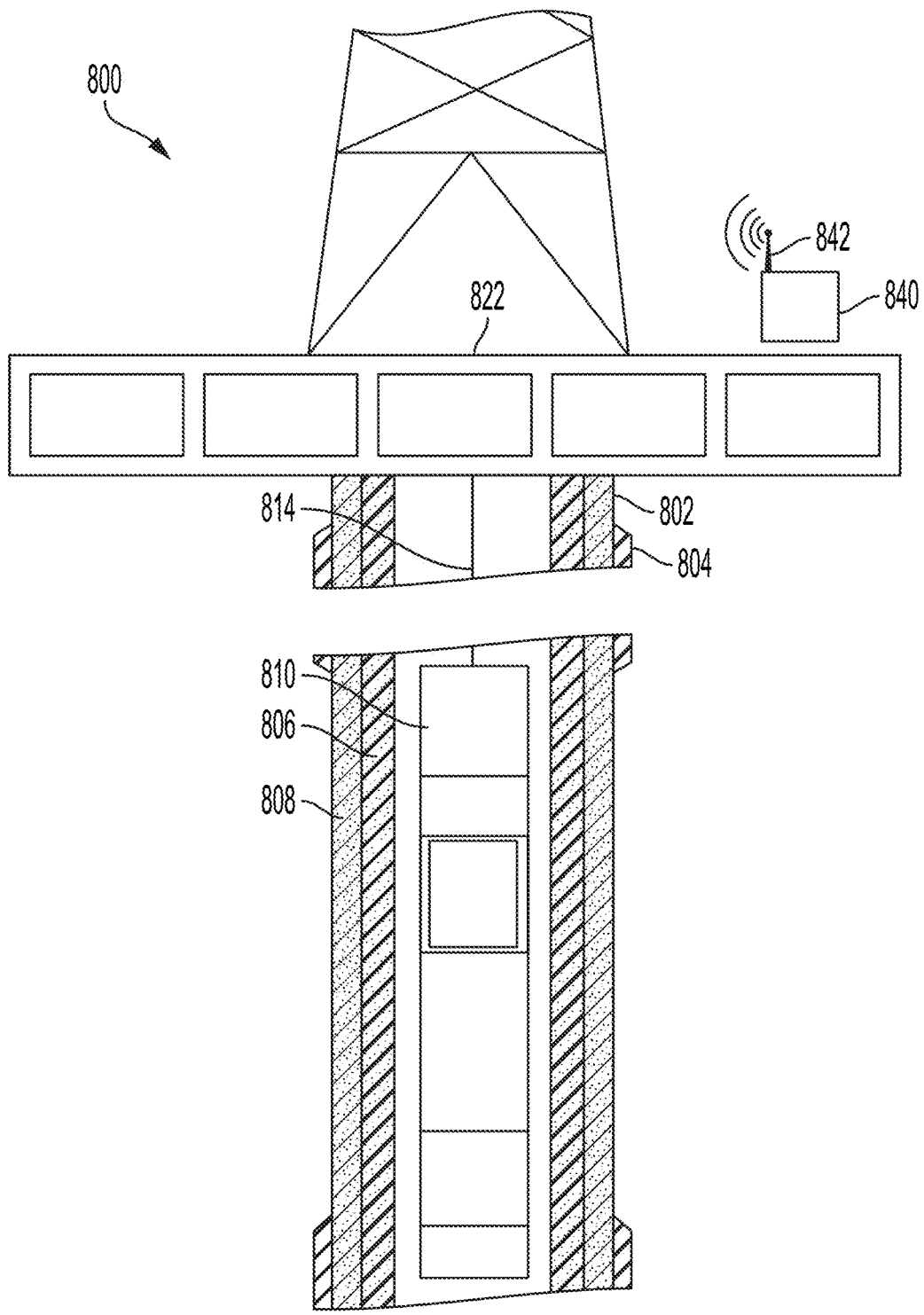
FIG. 8 a schematic of a well system associated with an estimated sustainability impact according to one example of the present disclosure.

FIG. 8 a schematic of a well system 800 associated with an estimated sustainability impact according to one example of the present disclosure. The well system 800 can include a wellbore 802 extending through various earth strata. The wellbore 802 can extend through a subterranean formation 804 that can include hydrocarbon material such as oil, gas, coal, or other suitable material. In some examples, a casing string 806 can extend from a well surface 822 into the subterranean formation 804. The casing string 806 can provide a conduit through which formation fluids, such as production fluids produced from the subterranean formation 804, can travel to the well surface 822. The casing string 806 can be coupled to walls of the wellbore 802 via cement or other suitable coupling material. For example, a cement sheath 808 can be positioned or formed between the casing string 806 and the walls of the wellbore 802 for coupling the casing string 806 to the wellbore 802. The casing string 806 can be coupled to the wellbore 802 using other suitable techniques.

The well system 800 can include at least one well tool, such as a well tool 810. The well tool 810 can be coupled to a wireline 814, a slickline, or a coiled tube that can be deployed into the wellbore 802. The wireline 814, the slickline, or the coiled tube can be guided into the wellbore 802 using, for example, a guide or winch. In some examples, the wireline 814, the slickline, or the coiled tube can be unwound from around a reel to be deployed into the wellbore 802.

A computing device 840 can be positioned at the surface 822 of the well system 800. In some examples, the computing device 840 can be positioned downhole in the wellbore 802, remote from the well system 800, or in other suitable locations with respect to the well system 800. The computing device 840 can be communicatively coupled to the well tool 810 or other suitable components of the well system 800 via a wired or wireless connections. For example, as illustrated in FIG. 8, the computing device 840 can include an antenna 842 that can allow the computing device 840 to receive and to send communications relating to the well system 800. The computing device 840 may be in communication with another computing device, such as the computing device 100 in FIG. 1, and can receive commands to adjust aspects of the well system 800 based on a determined sustainability impact associated with the well system 800. For example, the commands may adjust equipment usage or other aspects for the well system 800.

Although FIG. 8 is shown as a completion environment, the well system 800 may alternatively be associated with a drilling operation, a fracturing operation, or a production operation. In each wellbore operation, the computing device 840 may receive commands to adjust the operation based on the predicted sustainability outcome.

In some aspects, a system, a method, or a non-transitory computer-readable medium for estimating sustainability impacts according to one or more of the following examples:

As used below, any reference to a series of examples is to be understood as a reference to each of those examples disjunctively (e.g., "Examples 1-4" is to be understood as "Examples 1, 2, 3, or 4").

A system comprising a processing device; and a memory device that includes instructions executable by the processing device for causing the processing device to perform operations comprising: receiving, at a user interface, at least one constraint and a range for at least one parameter for a wellbore operation; generating, by at least one algorithm, a recommendation of a value for the at least one parameter within the range for the at least one parameter, the recommendation being based on a sustainability metric and the at least one constraint for the wellbore operation; and outputting, at the user interface, the recommendation of the value for the at least one parameter and an indication of additional outcomes for the sustainability metric associated with using other values within the range for the at least one parameter.

Example 2 is the system of example 1, wherein the memory device further includes instructions executable by the processing device for causing the processing device to: receive a weight to be associated with each constraint of the at least one constraint; and generate the recommendation based on the weight associated with each constraint of the at least one constraint.

Example 3 is the system of example(s) 1-2, wherein the memory device further includes instructions executable by the processing device for causing the processing device to: receive a selection of the recommendation for the wellbore operation; and generate a predicted sustainability outcome based on the selection and additional selections for additional wellbore operations.

Example 4 is the system of example(s) 1-3, wherein the selection is a first selection and the memory device further includes instructions executable by the processing device for causing the processing device to: receive a second selection of an additional outcome of the additional outcomes; and generate an updated predicted sustainability outcome based on the second selection and the additional selections for the additional wellbore operations.

Example 5 is the system of example 1-4, wherein the memory device further includes instructions executable by the processing device for causing the processing device to: compare the predicted sustainability outcome to a sustainability target; determine the predicted sustainability outcome exceeds the sustainability target; and determine an adjustment for the wellbore operation or the additional wellbore operations to cause the predicted sustainability outcome to meet the sustainability target.

Example 6 is the system of example(s) 1-5, wherein the at least one algorithm comprises a machine-learning model, a non-linear optimization, or a combination thereof.

Example 7 is the system of example(s) 1-6, wherein the memory device further includes instructions executable by the processing device for causing the processing device to output the recommendation by: displaying, at the user interface, a graph associated with the wellbore operation, the graph including the recommendation and the additional outcomes; presenting the graph on the user interface below the at least one parameter and the at least one constraint, and displaying an indication on the graph at a position corresponding to the recommendation.

Example 8 is a method comprising receiving, at a user interface, at least one constraint and a range for at least one parameter for a wellbore operation; generating, by at least one algorithm, a recommendation of a value for the at least one parameter within the range for the at least one parameter, the recommendation being based on a sustainability metric and the at least one constraint for the wellbore operation; and outputting, at the user interface, the recommendation of the value for the at least one parameter and an indication of additional outcomes for the sustainability metric associated with using other values within the range for the at least one parameter.

Example 9 is the method of example 8, further comprising: receiving a weight to be associated with each constraint of the at least one constraint; and generating the recommendation based on the weight associated with each constraint of the at least one constraint.

Example 10 is the method of example(s) 8-9, further comprising: receiving a selection of the recommendation for the wellbore operation; and generating a predicted sustainability outcome based on the selection and additional selections for additional wellbore operations.

Example 11 is the method of example(s) 8-10, wherein the selection is a first selection and the method further comprises: receiving a second selection of an additional outcome of the additional outcomes; and generating an updated predicted sustainability outcome based on the second selection and the additional selections for the additional wellbore operations.

Example 12 is the method of example(s) 8-11, further comprising: comparing the predicted sustainability outcome to a sustainability target; determining the predicted sustainability outcome exceeds the sustainability target; and determining an adjustment for the wellbore operation or the additional wellbore operations to cause the predicted sustainability outcome to meet the sustainability target.

Example 13 is the method of example(s) 8-12, wherein the at least one algorithm comprises a machine-learning model, a non-linear optimization, or a combination thereof.

Example 14 is the method of example(s) 8-13, wherein outputting the recommendation comprises: displaying, at the user interface, a graph associated with the wellbore operation, the graph including the recommendation and the additional outcomes; presenting the graph on the user interface below the at least one parameter and the at least one constraint, and displaying an indication on the graph at a position corresponding to the recommendation.

Example 15 is a non-transitory computer-readable medium comprising instructions that are executable by a processing device for causing the processing device to perform operations comprising receiving, at a user interface, at least one constraint and a range for at least one parameter for a wellbore operation; generating, by at least one algorithm, a recommendation of a value for the at least one parameter within the range for the at least one parameter, the recommendation being based on a sustainability metric and the at least one constraint for the wellbore operation; and outputting, at the user interface, the recommendation of the value for the at least one parameter and an indication of additional outcomes for the sustainability metric associated with using other values within the range for the at least one parameter.

Example 16 is the non-transitory computer-readable medium of example 15, further comprising instructions executable by the processing device for causing the processing device to: receive a weight to be associated with each constraint of the at least one constraint; and generate the recommendation based on the weight associated with each constraint of the at least one constraint.

Example 17 is the non-transitory computer-readable medium of example(s) 15-16, further comprising instructions executable by the processing device for causing the processing device to: receive a selection of the recommendation for the wellbore operation; and generate a predicted sustainability outcome based on the selection and additional selections for additional wellbore operations.

Example 18 is the non-transitory computer-readable medium of example(s) 15-17, wherein the selection is a first selection and further comprising instructions executable by the processing device for causing the processing device to: receive a second selection of an additional outcome of the additional outcomes; and generate an updated predicted sustainability outcome based on the second selection and the additional selections for the additional wellbore operations.

Example 19 is the non-transitory computer-readable medium of example(s) 15-18, further comprising instructions executable by the processing device for causing the processing device to: compare the predicted sustainability outcome to a sustainability target; determine the predicted sustainability outcome exceeds the sustainability target; and determine an adjustment for the wellbore operation or the additional wellbore operations to cause the predicted sustainability outcome to meet the sustainability target.

Example 20 is the non-transitory computer-readable medium of example(s) 15-19, further comprising instructions executable by the processing device for causing the processing device to output the recommendation by: displaying, at the user interface, a graph associated with the wellbore operation, the graph including the recommendation and the additional outcomes; presenting the graph on the user interface below the at least one parameter and the at least one constraint, and displaying an indication on the graph at a position corresponding to the recommendation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system for optimizing an environmental sustainability impact of hydrocarbon wellbore operations, the system comprising:
    a processing device; and
    a memory device that includes instructions executable by the processing device for causing the processing device to perform operations comprising:
        receiving, at a user interface, at least one operation constraint to be applied to a wellbore operation and a range for at least one parameter for the wellbore operation;
        generating, by at least one algorithm, a recommendation of a value for the at least one parameter within the range for the at least one parameter, the recommendation being based on an environmental sustainability metric and the at least one operation constraint to be applied to the wellbore operation; and outputting, at the user interface, the recommendation of the value for the at least one parameter and an indication of additional outcomes for the sustainability metric associated with using other values within the range for the at least one parameter.

2. The system of claim 1, wherein the memory device further includes instructions executable by the processing device for causing the processing device to:
receive a weight to be associated with each operation constraint of the at least one operation constraint; and
generate the recommendation based on the weight associated with each operation constraint of the at least one operation constraint.

3. The system of claim 1, wherein the memory device further includes instructions executable by the processing device for causing the processing device to:
receive a selection of the recommendation for the wellbore operation; and
generate a predicted environmental sustainability outcome based on the selection and additional selections for additional wellbore operations.

4. The system of claim 3, wherein the selection is a first selection and the memory device further includes instructions executable by the processing device for causing the processing device to:
receive a second selection of an additional outcome of the additional outcomes; and
generate an updated predicted environmental sustainability outcome based on the second selection and the additional selections for the additional wellbore operations.

5. The system of claim 3, wherein the memory device further includes instructions executable by the processing device for causing the processing device to:
compare the predicted environmental sustainability outcome to a sustainability target;
determine the predicted environmental sustainability outcome exceeds the sustainability target; and
determine an adjustment for the wellbore operation or the additional wellbore operations to cause the predicted environmental sustainability outcome to meet the sustainability target.

6. The system of claim 1, wherein the at least one algorithm comprises a machine learning model, a non-linear optimization, or a combination thereof.

7. The system of claim 1, wherein the memory device further includes instructions executable by the processing device for causing the processing device to output the recommendation by:
displaying, at the user interface, a graph associated with the wellbore operation, the graph including the recommendation and the additional outcomes;
presenting the graph on the user interface below the at least one parameter and the at least one operation constraint, and
displaying an indication on the graph at a position corresponding to the recommendation.

8. A method for optimizing an environmental sustainability impact of hydrocarbon wellbore operations, the method, comprising:
receiving, at a user interface, at least one operation constraint to be applied to a wellbore operation and a range for at least one parameter for the wellbore operation;
generating, by at least one algorithm, a recommendation of a value for the at least one parameter within the range for the at least one parameter, the recommendation being based on an environmental sustainability metric and the at least one operation constraint to be applied to the wellbore operation; and
outputting, at the user interface, the recommendation of the value for the at least one parameter and an indication of additional outcomes for the environmental sustainability metric associated with using other values within the range for the at least one parameter.

9. The method of claim 8, further comprising:
receiving a weight to be associated with each operation constraint of the at least one operation constraint; and
generating the recommendation based on the weight associated with each operation constraint of the at least one operation constraint.

10. The method of claim 8, further comprising:
receiving a selection of the recommendation for the wellbore operation; and
generating a predicted environmental sustainability outcome based on the selection and additional selections for additional wellbore operations.

11. The method of claim 10, wherein the selection is a first selection and the method further comprises:
receiving a second selection of an additional outcome of the additional outcomes; and
generating an updated predicted environmental sustainability outcome based on the second selection and the additional selections for the additional wellbore operations.

12. The method of claim 10, further comprising:
comparing the predicted environmental sustainability outcome to a sustainability target;
determining the predicted environmental sustainability outcome exceeds the sustainability target; and
determining an adjustment for the wellbore operation or the additional wellbore operations to cause the predicted environmental sustainability outcome to meet the sustainability target.

13. The method of claim 8, wherein the at least one algorithm comprises a machine-learning model, a non-linear optimization, or a combination thereof.

14. The method of claim 8, wherein outputting the recommendation comprises:
displaying, at the user interface, a graph associated with the wellbore operation, the graph including the recommendation and the additional outcomes;
presenting the graph on the user interface below the at least one parameter and the at least one operation constraint, and
displaying an indication on the graph at a position corresponding to the recommendation.

15. A non-transitory computer-readable medium comprising instructions that are executable by a processing device for causing the processing device to perform operations comprising:
receiving, at a user interface, at least one operation constraint to be applied to a wellbore operation and a range for at least one parameter for the wellbore operation;
generating, by at least one algorithm, a recommendation of a value for the at least one parameter within the range for the at least one parameter, the recommendation being based on an environmental sustainability metric and the at least one operation constraint to be applied to the wellbore operation; and outputting, at the user interface, the recommendation of the value for the at least one parameter and an indication of additional outcomes for the environmental sustainability metric associated with using other values within the range for the at least one parameter.

16. The non-transitory computer-readable medium of claim 15, further comprising instructions executable by the processing device for causing the processing device to:
receive a weight to be associated with each operation constraint of the at least one operation constraint; and
generate the recommendation based on the weight associated with each operation constraint of the at least one operation constraint.

17. The non-transitory computer-readable medium of claim 15, further comprising instructions executable by the processing device for causing the processing device to:
receive a selection of the recommendation for the wellbore operation; and
generate a predicted environmental sustainability outcome based on the selection and additional selections for additional wellbore operations.

18. The non-transitory computer-readable medium of claim 17, wherein the selection is a first selection and further comprising instructions executable by the processing device for causing the processing device to:
receive a second selection of an additional outcome of the additional outcomes; and
generate an updated predicted environmental sustainability outcome based on the second selection and the additional selections for the additional wellbore operations.

19. The non-transitory computer-readable medium of claim 17, further comprising
instructions executable by the processing device for causing the processing device to:
compare the predicted environmental sustainability outcome to a sustainability target;
determine the predicted environmental sustainability outcome exceeds the sustainability target; and
determine an adjustment for the wellbore operation or the additional wellbore operations to cause the predicted environmental sustainability outcome to meet the sustainability target.

20. The non-transitory computer-readable medium of claim 15, further comprising instructions executable by the processing device for causing the processing device to output the recommendation by:
displaying, at the user interface, a graph associated with the wellbore operation, the graph including the recommendation and the additional outcomes;
presenting the graph on the user interface below the at least one parameter and the at least one operation constraint, and
displaying an indication on the graph at a position corresponding to the recommendation.

* * * * *